US011448516B2

(12) United States Patent
Johnson, Jr. et al.

(10) Patent No.: US 11,448,516 B2
(45) Date of Patent: Sep. 20, 2022

(54) SCENIC ROUTE-BASED NAVIGATION DIRECTIONS

(71) Applicant: GOOGLE LLC, Mountain View, CA (US)

(72) Inventors: Joseph Johnson, Jr., Mountain View, CA (US); Chris Hluchan, Mountain View, CA (US); Shiblee Hasan, Mountain View, CA (US); David Lee, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 391 days.

(21) Appl. No.: 16/707,408

(22) Filed: Dec. 9, 2019

(65) Prior Publication Data

US 2021/0172753 A1 Jun. 10, 2021

(51) Int. Cl.
*G01C 21/34* (2006.01)
*G06N 20/00* (2019.01)

(52) U.S. Cl.
CPC ..... *G01C 21/3484* (2013.01); *G01C 21/3476* (2013.01); *G06N 20/00* (2019.01)

(58) Field of Classification Search
CPC . G01C 21/3484; G01C 21/3476; G06N 20/00
See application file for complete search history.

(56) References Cited

U.S. PATENT DOCUMENTS

| 6,922,633 | B2 * | 7/2005 | Takenaka | G01C 21/343 |
| | | | | 701/428 |
| 7,512,487 | B1 * | 3/2009 | Golding | G01C 21/3492 |
| | | | | 701/424 |
| 8,532,927 | B2 | 9/2013 | Joshi et al. | |
| 9,410,816 | B2 | 8/2016 | Aiello et al. | |
| 9,494,440 | B2 * | 11/2016 | Sofinski | G01C 21/343 |
| 9,689,690 | B2 | 6/2017 | Rolf | |
| 2003/0093217 | A1 * | 5/2003 | Petzold | G01C 21/3484 |
| | | | | 701/411 |
| 2006/0184314 | A1 * | 8/2006 | Couckuyt | G01C 21/3423 |
| | | | | 340/995.19 |
| 2009/0018766 | A1 * | 1/2009 | Chen | G01C 21/3611 |
| | | | | 701/533 |

(Continued)

FOREIGN PATENT DOCUMENTS

CN 105205559 A 12/2015

*Primary Examiner* — Ramsey Refai
(74) *Attorney, Agent, or Firm* — Marshall, Gerstein & Borun LLP

(57) ABSTRACT

To provide navigation directions for a scenic route, a machine learning model is trained using (i) characteristics of road segments that have been assigned a scenic metric and (ii) the scenic metrics for the road segments. In response to a request for navigation directions, a set of candidate routes for navigating from the starting location to the destination location is identified. Then for each road segment within each candidate route, characteristics of the road segment are applied to the machine learning model to generate the scenic metric for the road segment. A route is then selected from the set of candidate routes based at least in part on the scenic metrics of the road segments within the route. A set of navigation directions is provided for presentation on a client device for navigating from the starting location to the destination location via the selected route.

20 Claims, 8 Drawing Sheets

(56) References Cited

U.S. PATENT DOCUMENTS

| | | | |
|---|---|---|---|
| 2011/0153191 A1* | 6/2011 | Dhanani | G01C 21/3617 |
| | | | 701/533 |
| 2013/0131986 A1* | 5/2013 | Van Seggelen | G01C 21/3664 |
| | | | 701/533 |
| 2014/0046584 A1 | 2/2014 | Aben et al. | |
| 2015/0160030 A1* | 6/2015 | costello | G01C 21/3476 |
| | | | 701/533 |
| 2015/0285652 A1* | 10/2015 | Peri | G01C 21/3476 |
| | | | 701/438 |
| 2017/0016733 A1* | 1/2017 | Rolf | G06F 16/325 |
| 2017/0314945 A1* | 11/2017 | König | G01C 21/3461 |
| 2018/0094943 A1 | 4/2018 | Grochocki, Jr. et al. | |
| 2018/0364054 A1* | 12/2018 | Chen | G06Q 10/06 |
| 2019/0333369 A1* | 10/2019 | Malkes | G08G 1/096838 |

\* cited by examiner

200 Road Segment / 220 Map Feature Data / 230 Scenic Metric

| 202 Segment ID | 204 Location | 206 Distance to Landmark | 208 Size of Landmark | 212 Landmark Visibility | 214 Landmark Popularity | 216 Date/Time | 218 Terms | 222 Scenic Metric |
|---|---|---|---|---|---|---|---|---|
| 1 | US 101 mile 415 | 100 m | 4 km long | High | High | 10/31 at 3 p.m. | "Magnificent," "Breathtaking" | 8.3 |
| 2 | Mission Street/10th Street, SF, CA | 200 m | 20 m high | Medium | Medium | 6/1 at 11 a.m. | | 6.2 |
| 3 | Great Highway, SF, CA | 1000 m | > 10 km | High | Medium | 12/20 at 9 p.m. | "Beautiful," "Peaceful," "Scenic," "Ocean views" | 7.4 |
| 4 | Stockton Street/ Chinatown, SF, CA | 50 m | 100 m wide | Low | Low | 7/3 at 11 p.m. | "Nothing special," "Overrated," "Hard to see" | 2.1 |

FIG. 2

SCENIC ROUTE-BASED NAVIGATION DIRECTIONS

FIELD OF THE DISCLOSURE

The present disclosure relates to digital mapping data and, more particularly, to selecting scenic navigation routes for guiding a user.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many users request map and navigation data for various geographic locations. Software applications executing in computers, smartphones, embedded devices, etc., generate step-by-step navigation directions in response to receiving input from a user, specifying the starting point and the destination. The navigation directions are typically generated for a route which guides the user to the destination in the shortest amount of time.

SUMMARY

In response to a request for navigation directions, a scenic route generation engine in a server device may select a route based on the views from the road segments along the route. For example, the scenic route generation engine may select a route from a starting location to a destination location with road segments that overlook a mountain range, a canyon, a river, a lake, a historic landmark, etc. The scenic route generation engine assigns a scenic metric to each road segment which is indicative of the quality of the view from the road segment. In some implementations, the scenic route generation engine generates the scenic metric for a road segment by training a machine learning model using characteristics of several road segments where scenic metrics have previously been determined. For example, scenic metrics may be assigned to a subset of road segments as training data for the machine learning model. Then the scenic route generation engine may generate the machine learning model based on the characteristics and the scenic metrics assigned to the subset of road segments. More specifically, the subset of road segments may be classified according to their respective scenic metrics (e.g., a first set of road segments having a first scenic metric or range of scenic metrics may be classified into a first group, a second set of road segments having a second scenic metric or range of scenic metrics may be classified into a second group, etc.), and the scenic route generation engine may analyze the characteristics of the road segments in each group to generate the machine learning model.

The characteristics of a road segment may include map feature data, such as the location of the road segment, the length of the road segment, distances from the road segment to various landmarks and/or a distance from the road segment to the nearest landmark, a size of the nearest landmark, a visibility metric indicative of visibility of the nearest landmark from the road segment, a popularity metric indicative of popularity of the landmark, etc. The characteristics of a road segment may also include the date and/or time in which the scenic metric is assigned to the road segment. For example, a road segment may be more scenic in the winter than the summer if it is close to a landmark famous for its holiday decorations. The date and/or time in which the scenic metric is assigned to the road segment may be compared to sunset/sunrise times at the location of road segment, for example to determine the time of day in which the scenic metric is assigned for comparison to other times on other dates. For example, the visibility from the road segment at 8 p.m. during the summer may be similar to the visibility from the road segment at 5 p.m. during the winter when both times are near sunset. Moreover, the sunset or sunrise may be visible behind certain landmarks from the road segment which may result in a very scenic view. Furthermore, the characteristics of the road segment may include weather conditions and/or temperature data when the scenic metric is assigned to the road segment. For example, some landmarks may be more difficult to see during foggy or rainy conditions. An air quality metric such as an Air Quality Index (AQI) may also be used as a characteristic of the road segment. When the air quality metric is above a threshold level, landmarks may become difficult to see. Also, when the temperature is undesirable users may be less likely to leave their vehicles to view the scenery. Additionally, the characteristics of the road segment may include terms associated with the road segment including terms associated with the location corresponding to the road segment from reviews, blogs, search results, photo sharing platforms, etc. The terms associated with the road segment may be descriptive of the view from the road segment, such as "scenic," "beautiful," "obstructed," "overrated," etc.

When a user requests navigation directions from a starting location to a destination location, the scenic route generation engine may identify a set of candidate routes from the starting location to the destination location or may identify road segments within a geographic area that includes the starting location and the destination location. Then the scenic route generation engine may identify characteristics of road segments along the candidate routes and/or road segments within the geographic area and may apply the characteristics of each road segment to the machine learning model to identify a scenic metric for the road segment. The scenic route generation engine may then assign a score to each road segment based on the scenic metric for the road segment. The score may also be based on the estimated time period for traversing the road segment. The scenic route generation engine may aggregate or combine the overall scores for the road segments in any suitable manner to generate an overall score for a candidate route from the starting location to the destination location.

Then the scenic route generation engine ranks the candidate routes according to their overall scores and selects the candidate route having the highest or lowest overall score as the route to provide to the user. The scenic route generation engine then transmits a set of navigation directions for presentation on the client device for navigating from the starting location to the destination location via the selected route.

In some implementations, a navigation application includes a user control for selecting a preference for a scenic route. In response to a selection of the user control, the scenic route generation engine selects the route having the highest combined scenic metrics for road segments along the route. In other implementations, the scenic route generation engine provides indications of each of the candidate routes to the client device with an indication of the candidate route that is the most scenic.

In some implementations, the user may request a tour of a geographic area (e.g., San Francisco) from a starting location (e.g., a hotel in San Francisco). The scenic route generation engine may identify road segments within the geographic area and apply characteristics of the road segments to the machine learning model to generate scenic metrics for the road segments or may obtain scenic metrics for the road segments from a database. In any event, the scenic route generation engine may select a subset of the road segments within the geographic area having scenic metrics above a threshold metric. In other implementations, the scenic route generation engine may rank the road segments according to their respective scenic metrics and select a subset of the road segments within the geographic area that are ranked above a threshold ranking. Then the scenic route generation engine may generate a route beginning at the starting location and ending at the starting location, where the route includes each of the selected road segments. The scenic route generation engine may then transmit a set of navigation directions for presentation on the client device for navigating on the tour around the geographic area from the starting location via the generated route.

Aspects of the present disclosure provide a technical solution to the problem of how to identify and select routes in response to a request for navigation directions. For example, objective real world map data in the form of map feature data relating to specific road segments can be obtained and processed by a machine learning model to determine scenic metrics for each of the road segments. The determined scenic metrics can then be used in the selection of routes comprising one or more of the road segments. In this way, a specific route can be determined based at least on objective real world map data and associated scenic metrics.

In particular, an example embodiment of the techniques of the present disclosure is a method for selecting a scenic route in response to a request for navigation directions. The method includes training a machine learning model using (i) map feature data for each of a plurality of road segments, and (ii) a scenic metric for each of the plurality of road segments indicative of a quality of a view from the road segment. The method further includes receiving a request for navigation directions from a starting location to a destination location, and identifying a set of candidate routes for navigating from the starting location to the destination location. For each road segment on each candidate route in the set of candidate routes, the method includes obtaining map feature data for the road segment, and applying the machine learning model to the map feature data for the road segment to generate a scenic metric for the road segment. Moreover, the method includes selecting a route from the set of candidate routes based at least in part on the scenic metrics for each candidate route, and providing a set of navigation directions for presentation on a client device for navigating from the starting location to the destination location via the selected route.

Another embodiment of these techniques is a computing device for selecting a scenic route in response to a request for navigation directions. The computing device includes one or more processors and a non-transitory computer-readable medium storing instructions thereon. When executed by the one or more processors, the instructions cause the computing device to train a machine learning model using (i) map feature data for each of a plurality of road segments, and (ii) a scenic metric for each of the plurality of road segments indicative of a quality of a view from the road segment. The instructions further cause the computing device to receive a request for navigation directions from a starting location to a destination location, and identify a set of candidate routes for navigating from the starting location to the destination location. For each road segment on each candidate route in the set of candidate routes, the instructions cause the computing device to obtain map feature data for the road segment, and apply the machine learning model to the map feature data for the road segment to generate a scenic metric for the road segment. Moreover, the instructions cause the computing device to select a route from the set of candidate routes based at least in part on the scenic metrics for each candidate route, and provide a set of navigation directions for presentation on a client device for navigating from the starting location to the destination location via the selected route.

Yet another embodiment of these techniques is method for providing navigation directions in response to a request for a tour of a geographic area. The method includes receiving a request for a tour of a geographic area beginning and ending at a starting location. For each road segment in the geographic area, the method includes assigning a scenic metric to the road segment indicative of a quality of a view from the road segment. The method further includes selecting a subset of the road segments in the geographic area based on the scenic metrics of the road segments, generating a route beginning and ending at the starting location, the route including each of the selected subset of road segments, and providing a set of navigation directions for presentation on a client device for navigating on the tour around the geographic area via the generated route.

BRIEF DESCRIPTION OF THE DRAWINGS

FIG. 2 illustrates an example data table including characteristics of road segments which the scenic route generation system of FIG. 1 can utilize to generate a machine learning model for generating a scenic metric for a road segment;

DETAILED DESCRIPTION

Overview

Figure 1:
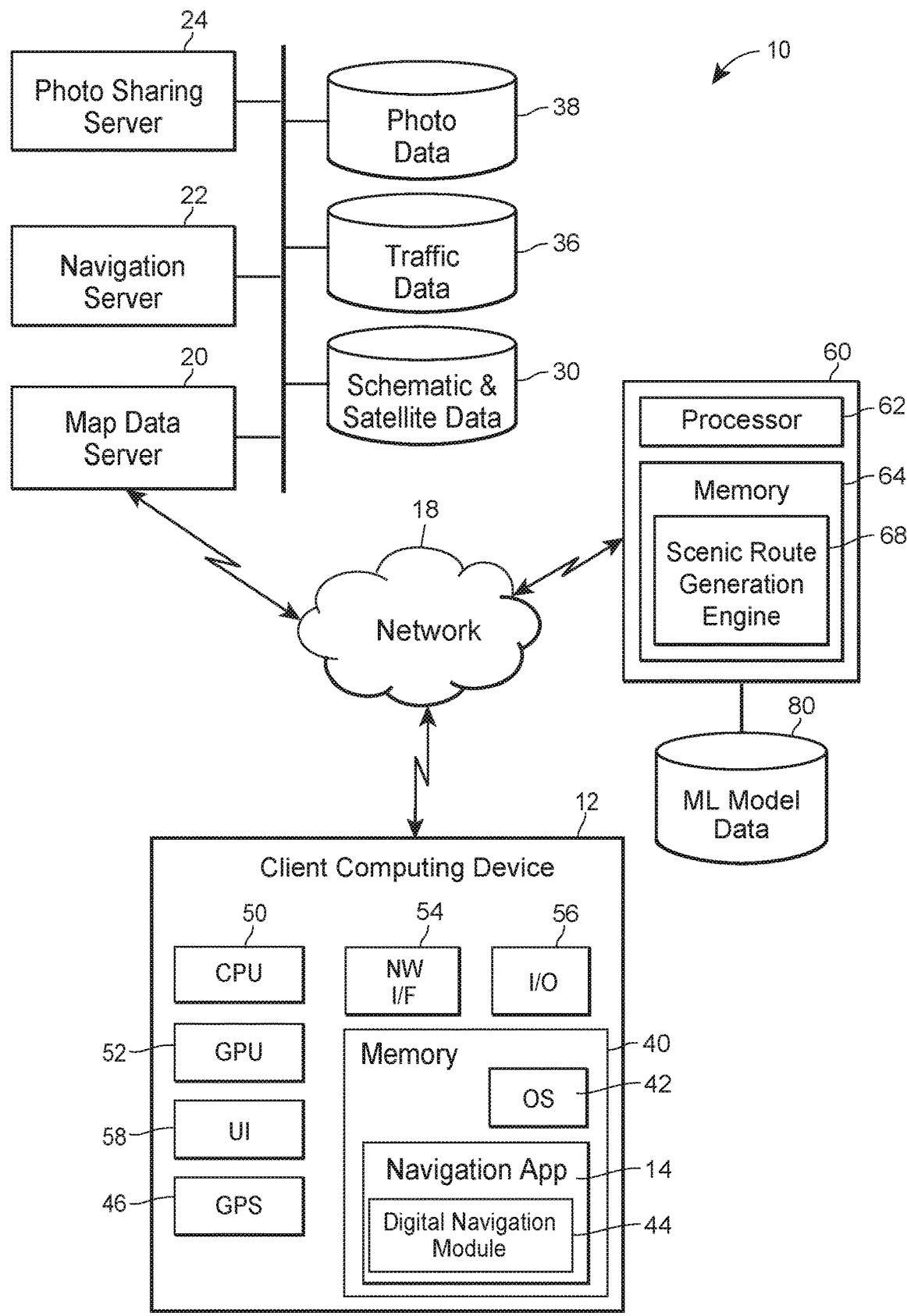
FIG. 1 illustrates a block diagram of an example communication system in which techniques for generating a set of navigation directions based on the quality of the views from the road segments can be implemented.

Generally speaking, the techniques for selecting scenic routes can be implemented in one or several client computing device, one or several network servers or a system that includes a combination of devices. However, for clarity, the examples below focus primarily on an embodiment in which a navigation application executes on a client computing device and includes user controls for requesting navigation directions from a starting location to a destination location. The navigation application may also include user controls for requesting a scenic route or for requesting a tour of a geographic area such as a city beginning and ending at a starting location. The client computing device may transmit the request including the starting location, the destination location, user preferences for a scenic route or a tour, etc., to a scenic route generation server.

The scenic route generation server may then obtain a set of candidate routes from the starting location to the destination location for example, from a navigation server or may obtain a set of road segments within a geographic area that includes the starting location and the destination location. Additionally, the scenic route generation server may train a machine learning model to generate scenic metrics for road segments, where the scenic metrics indicate a measure of the quality of the views from the road segments. The scenic route generation server trains the machine learning model by using characteristics of several road segments where scenic metrics have previously been determined. For example, the scenic metrics may be assigned to a subset of road segments from surveys, reviews, or other crowdsourced data. Then the scenic route generation engine may generate the machine learning model based on the characteristics and the scenic metrics assigned to the subset of road segments.

The characteristics of a road segment may include map feature data, such as the location of the road segment, the length of the road segment, distances from the road segment to various landmarks and/or a distance from the road segment to the nearest landmark, a size of the nearest landmark, a visibility metric indicative of visibility of the nearest landmark from the road segment, a popularity metric indicative of popularity of the landmark, etc. The characteristics of a road segment may also include the date and/or time in which the scenic metric is assigned to the road segment. For example, a road segment may be more scenic in the winter than the summer if it is close to a landmark famous for its holiday decorations. The date and/or time in which the scenic metric is assigned to the road segment may be compared to sunset/sunrise times at the location of road segment, for example to determine the time of day in which the scenic metric is assigned for comparison to other times on other dates. Furthermore, the characteristics of the road segment may include weather conditions and/or temperature data when the scenic metric is assigned to the road segment. For example, some landmarks may be more difficult to see during foggy or rainy conditions. An air quality metric such as an Air Quality Index (AQI) may also be used as a characteristic of the road segment. When the air quality metric is above a threshold level, landmarks may become difficult to see. Also, when the temperature is undesirable users may be less likely to leave their vehicles to view the scenery. Additionally, the characteristics of the road segment may include terms associated with the road segment including terms associated with the location corresponding to the road segment from reviews, blogs, search results, photo sharing platforms, etc. The terms associated with the road segment may be descriptive of the view from the road segment, such as "scenic," "beautiful," "obstructed," "overrated," etc.

The scenic route generation server may then identify characteristics of the road segments on the candidate routes or in the geographic area for example, from a map data server that stores map feature data, from a photo sharing server indicating locations of viewpoints for photographs, from reviews, blogs, search results, etc. The scenic route generation server may then assign a score to each road segment based on the scenic metric for the road segment. The score may also be based on the estimated time period for traversing the road segment. The scenic route generation server may aggregate or combine the overall scores for the road segments in any suitable manner to generate an overall score for a candidate route from the starting location to the destination location.

Then the scenic route generation engine ranks the candidate routes according to their overall scores and selects the candidate route having the highest or lowest overall score as the route to provide to the user. The scenic route generation server then transmits a set of navigation directions for presentation on the client computing device for navigating from the starting location to the destination location via the selected route.

Example Hardware and Software Components

Referring to FIG. 1, an example communication system 10 in which a scenic route generation system can be implemented includes a client computing device 12 (also referred to herein as a "client device") configured to execute a geographic application 14, which also can be referred to as "navigation application 14." Depending on the implementation, the navigation application 14 can display an interactive digital map, request and receive routing data to provide driving, walking, or other navigation directions, provide tours of geographic areas, provide various geolocated content, etc. The client device 12 may be operated by a user displaying a digital map while navigating to various locations.

In addition to the client device 12, the communication system 10 includes a scenic route generation server 60 configured to provide a selected route for navigating from a starting location to a destination location to the client device 12, where the route is selected based at least in part on the quality of the views of the road segments along the route. The scenic route generation server 60 can be communicatively coupled to a database 80 that stores, in an example implementation, machine learning models for generating a scenic metric for a road segment based on the characteristics of the road segment. The database 80 may also store training data for training the machine learning models, such as map feature data for each road segment including the location of the road segment, the length of the road segment, distances from the road segment to various landmarks and/or a distance from the road segment to the nearest landmark, a size of the nearest landmark, a visibility metric indicative of visibility of the nearest landmark from the road segment, a popularity metric indicative of popularity of the landmark, the date and/or time in which the scenic metric is assigned to the road segment, sunset/sunrise times for the location corresponding to the road segment, weather conditions, an air quality metric, and/or temperature data for the location corresponding to the road segment, terms associated with the road segment, etc. Furthermore, the database 80 may store indications of scenic metrics for road segments where the scenic metric has previously been determined.

More generally, the scenic route generation server 60 can communicate with one or several databases that store any type of suitable geospatial information. The communication system 10 also can include a navigation data server 22 that provides driving, walking, biking, or public transit directions, for example for presentation via the navigation application 14. Further, the communication system 10 can include a map data server 20 that provides map data including map features data for road segments or for locations corresponding to the road segments. The devices operating in the communication system 10 can be interconnected via a communication network 18.

The map data server 20 and navigation server 22 are coupled to a map database 30 which includes schematic and satellite data storing street and road information, topographic data, satellite imagery, etc. The servers 20, 22 are also coupled to a traffic database 36 which includes current traffic conditions, and also may include road closure data, estimated time data, etc. Furthermore, a photo sharing server 24 is coupled to a photo database 38 which stores photographs captured from various locations and at various times. The photo database 38 may store the photographs along with indications of when and where they were captured. In general, the navigation server 22 can receive information related to geographic locations from any number of suitable databases, web services, etc. Additionally, the servers 20, 22 are coupled to a weather database (not shown) which includes current weather data in various geographic areas. One or more operators can periodically update the databases 30, 36, and 38 where each operator provides updates to the databases 30, 36, and 38 at respective time intervals. For example, the traffic 36, weather, and photo 38 databases may store substantially real-time data, whereas the schematic and satellite database 30 may be updated relatively infrequently, such as once a week.

The schematic and satellite database 30 can store data in a raster format, a vector format, in any other suitable format or any combination thereof. In some implementations, the data is organized into map tiles at multiple zoom levels to facilitate serving map data to client devices. The schematic and satellite database 30 may also store three-dimensional map data such as street level views of the surroundings from various locations. The three-dimensional map data may be captured using specialized equipment such as a high-resolution camera with a wide-angle lens or fish eye lens and/or image sensors such as LIDAR (Light Detection and Ranging) sensors to detect depth. Several photographs of geolocated imagery captured by the camera or by several cameras having narrow lenses may then be stitched together to generate the three-dimensional map data. The three-dimensional map data may be rendered onto a surface of a virtual cylinder to simulate the feeling that a user is in the middle of a scene, such as a rectangular cross-section of the virtual cylinder or onto any other surface of a three-dimensional solid centered around the perspective of the user. In another example, the three-dimensional map data may include a three-dimensional rendering of real-world buildings, trees, signs, and other objects located within the geographic area. Furthermore, the three-dimensional map data may include any combination of photographs projected onto a virtual cylinder and three-dimensional renderings of real-world objects located within the geographic area. The views may be displayed from the viewpoint of a virtual camera.

Depending on the implementation, the navigation server 22 can provide map and directions data to client devices separately or together in map tiles, for example. In other embodiments, the map data and navigation directions may be generated remotely on remote servers separate from the map data server 20 and navigation server 22. Moreover, in some embodiments, the map and navigation directions may be generated by a combination of the map data server 20, the navigation server 22, and any number of additional servers.

In some implementations, the scenic route generation server 60 receives map and directions data from the map data server 20 and/or the navigation server 22 including a set of candidate routes each including a set of road segments for navigating from the starting location to the destination location. The scenic route generation server 60 then analyzes each candidate route in the set of candidate routes based on the estimated time periods for traversing each road segment in the candidate route, for example based on the amount of traffic on each road segment, the scenic metrics for each road segment, etc. In other implementations, the scenic route generation server 60 communicates directly with the schematic and satellite database 30, and the traffic database 36 to generate a set of candidate routes from the starting location to the destination location and then select a route from the set of candidate routes to provide to the user for navigating to the destination location.

The client device 12 may be a portable device such as smart phone or a tablet computer, for example. The client device 12 may also be a laptop computer, a desktop computer, a personal digital assistant (PDA), a wearable device such as a smart watch or smart glasses, etc. The client device 12 also can communicate with various content providers, servers, etc. via a wired or wireless communication network 18 such as a fourth- or third-generation cellular network (4G or 3G, respectively). The client device 12 may include a memory 40, one or more processors (CPUs) 50, a graphics processing unit (GPU) 52, a network interface unit 54, an I/O module 56, a user interface (UI) 58 for displaying map data and directions, and a global positioning system (GPS) 46 or another suitable positioning module. The memory 40 can be a non-transitory memory and can include one or several suitable memory modules, such as random access memory (RAM), read-only memory (ROM), flash memory, other types of persistent memory, etc. The I/O module 56 may be a touch screen, for example. In various implementations, the client device 12 can include fewer components than illustrated in FIG. 1 or conversely, additional components.

The memory 40 stores an operating system (OS) 42, which can be any type of suitable mobile or general-purpose operating system. The memory 40 also stores a navigation application 14 which is configured to generate interactive digital maps and/or perform other geographic functions, as indicated above. The navigation application 14 can receive map data in a raster (e.g., bitmap) or non-raster (e.g., vector graphics) format from the map data server 20 and present the map data via the digital navigation module 44. In some cases, the map data can be organized into layers, such as a basic layer depicting roads, streets, natural formations, etc., a traffic layer depicting current traffic conditions, a weather layer depicting current weather conditions, a navigation layer depicting a path to reach a destination, etc. The navigation application 14 also can display driving, walking, or transit directions, and in general provide functions related to geography, geolocation, navigation, etc. via the digital navigation module 44. Additionally, the navigation application 14 can display directions for providing a tour around a geographic area, such as a city, and can include user controls for selecting user preferences such as a preference for scenic routes rather than the fastest routes.

The digital navigation module 44 in the navigation application 14 is configured to transmit a request for navigation directions from a starting location to a destination location, receive a set of navigation directions for navigating along a route to the destination location, and present the set of navigation directions on the user interface 58. The digital navigation module 44 in the navigation application 14 is also configured to transmit a request for a tour around a geographic area beginning and ending at a starting location, receive a set of navigation directions for navigating along a route four the tour, and present the set of navigation directions on the user interface 58.

It is noted that although FIG. 1 illustrates the navigation application 14 as a standalone application, the functionality of the navigation application 14 also can be provided in the form of an online service accessible via a web browser executing on the client device 12, as a plug-in or extension for another software application executing on the client device 12, etc. The navigation application 14 generally can be provided in different versions for different respective operating systems. For example, the maker of the client device 12 can provide a Software Development Kit (SDK) including the navigation application 12 for the Android™ platform, another SDK for the iOS™ platform, etc.

In some implementations, the scenic route generation server 60 includes one or more processors 62 and a memory 64. The memory 64 may be tangible, non-transitory memory and may include any types of suitable memory modules, including random access memory (RAM), read-only memory (ROM), flash memory, other types of persistent memory, etc. The memory 64 stores instructions executable on the processors 62 that make up a scenic route generation engine 68, which can generate a route for navigating from a starting location to a destination location based at least in part on the scenic metrics for the road segments along the route. The scenic route generation engine 68 can also generate a set of routes each for navigating from the starting location to the destination location and rank the set of routes according to the scenic metrics for the road segments on each route, and the estimated time periods for traversing each road segment, for example based on the amount of traffic on each road segment. Additionally, the scenic route generation engine 68 may provide an indication of the route or the set of routes in a ranked order for display by the digital navigation module 44 of the client device 12.

The scenic route generation engine 68 and the digital navigation module 44 can operate as components of a scenic route generation system. Alternatively, the scenic route generation system can include only server-side components and simply provide the digital navigation module 44 with instructions to display the set(s) of navigation directions for traveling from the starting location to the destination location along the route(s). In other words, scenic route generation techniques in these embodiments can be implemented transparently to the digital navigation module 44. As another alternative, the entire functionality of the scenic route generation engine 68 can be implemented in the digital navigation module 44.

For simplicity, FIG. 1 illustrates the scenic route generation server 60 as only one instance of a server. However, the scenic route generation server 60 according to some implementations includes a group of one or more server devices, each equipped with one or more processors and capable of operating independently of the other server devices. Server devices operating in such a group can process requests from the client device 12 individually (e.g., based on availability), in a distributed manner where one operation associated with processing a request is performed on one server device while another operation associated with processing the same request is performed on another server device, or according to any other suitable technique. For the purposes of this discussion, the term "server device" may refer to an individual server device or to a group of two or more server devices.

In operation, the digital navigation module 44 operating in the client device 12 receives and transmits data to the scenic route generation server 60. Thus, in one example, the client device 12 may transmit a communication to the scenic route generation engine 68 (implemented in the scenic route generation server 60) requesting navigation directions from a starting location to a destination location.

Accordingly, the scenic route generation engine 68 may obtain indications of road segments for a geographic area that includes the starting location and the destination location. The scenic route generation engine 68 may also obtain a scenic metric for each road segment in the geographic area. More specifically, in some implementations, the scenic route generation engine 68 obtains the scenic metrics for the road segments in the geographic area using machine learning techniques. For example, the scenic route generation engine 68 may obtain indications of road segments where scenic metrics have previously been determined (e.g., based on crowd sourced data, surveys, etc.) and may identify characteristics of each of these road segments. The characteristics of a road segment may include map feature data, such as the location of the road segment, the length of the road segment, distances from the road segment to various landmarks and/or a distance from the road segment to the nearest landmark, a size of the nearest landmark, a visibility metric indicative of visibility of the nearest landmark from the road segment, a popularity metric indicative of popularity of the landmark, etc. The characteristics of a road segment may also include the date and/or time in which the scenic metric is assigned to the road segment. The date and/or time in which the scenic metric is assigned to the road segment may be compared to sunset/sunrise times at the location of road segment, for example to determine the time of day in which the scenic metric is assigned for comparison to other times on other dates. Moreover, the sunset or sunrise may be visible behind certain landmarks from the road segment which may result in a very scenic view. Furthermore, the characteristics of the road segment may include weather conditions and/or temperature data when the scenic metric is assigned to the road segment. An air quality metric such as an Air Quality Index (AQI) may also be used as a characteristic of the road segment. When the air quality metric is above a threshold level, landmarks may become difficult to see. Additionally, the characteristics of the road segment may include terms associated with the road segment including terms associated with the location corresponding to the road segment from reviews, blogs, search results, photo sharing platforms, etc.

Then the scenic route generation engine 68 may generate the machine learning model based on the characteristics and the scenic metrics assigned to the road segments. In some implementations, each of the road segments may be classified according to the scenic metric assigned to the road segment (e.g., a first set of road segments having a first scenic metric or range of scenic metrics may be classified into a first group, a second set of road segments having a second scenic metric or range of scenic metrics may be classified into a second group, etc.). The scenic route generation engine 68 may then analyze the characteristics of the road segments in each group to generate the machine learning model. The scenic metric may be a score for example from 1 to 10, may be a category selected from a set of categories such as scenic, not scenic, very scenic, slightly scenic, moderately scenic, etc., or may be any suitable metric of the quality of the view from the road segment.

The machine learning model may include a set of characteristic values for each scenic metric (e.g., 8), range of scenic metrics (e.g., from 5-7), or scenic metric category (e.g., scenic, not scenic, very scenic, slightly scenic, moderately scenic, etc.). The set of characteristic values may be an average visibility metric for the particular scenic metric, a maximum visibility metric for the particular scenic metric, an average distance from the road segment to the nearest landmark for the particular scenic metric, a standard deviation, variation, or range of the distances from the road segment to the nearest landmark for the particular scenic metric, an average popularity metric of the nearest landmark for the particular scenic metric, a set of terms associated with road segments having the particular scenic metric, etc.

The scenic route generation engine 68 may then obtain characteristics of the road segments within the geographic area including the requested starting location and destination location which have not been assigned scenic metrics. For example, the characteristics may be obtained from a map data server that stores map feature data, from a photo sharing server indicating locations of viewpoints for photographs, from reviews, blogs, search results, etc. The scenic route generation engine 68 may apply the characteristics of a road segment to the machine learning model using machine learning techniques. The machine learning techniques may include linear regression, polynomial regression, logistic regression, random forests, boosting such as adaptive boosting, gradient boosting, and extreme gradient boosting, nearest neighbors, Bayesian networks, neural networks, support vector machines, or any other suitable machine learning technique.

For example, when the machine learning technique is random forests, the scenic route generation engine 68 may collect several representative samples of each of the subsets of the training data. Using each representative sample, the scenic route generation engine 68 may generate a decision tree for generating a scenic metric. The scenic route generation engine 68 may then aggregate and/or combine each of the decision trees to generate the machine learning model, by for example averaging the scenic metrics determined at each individual tree, calculating a weighted average, taking a majority vote, etc. In some embodiments, the scenic route generation engine 68 may also generate decision trees when the machine learning technique is boosting.

Each decision tree may include several nodes, branches, and leaves, where each node of the decision tree represents a test on a road segment characteristic (e.g., is the distance to the nearest landmark less than 100 meters?). Each branch represents the outcome of the test (e.g., the distance to the nearest landmark is less than 100 meters). Moreover, each leaf represents a different scenic metric (e.g., 2), range of scenic metrics (e.g., 2-4), or confidence interval (e.g., 1.6-3.8 with 95 percent confidence) based on the combined test outcomes for the branches which connect to the leaf.

For example, the scenic route generation engine 68 may generate a decision tree where a first node corresponds to whether the visibility for the nearest landmark is better than low visibility according to the visibility metric. If the visibility is not better than low visibility, a first branch may connect to a first leaf node which may indicate that the scenic metric is between 1 and 2.5. If the visibility is better than low visibility, a second branch may connect to a second node which corresponds to whether the landmark is very popular according to the popularity metric.

If the landmark is very popular, a third branch may connect to a second leaf node which may indicate that the scenic metric is between 7 and 9. However, if the landmark is not very popular, a fourth branch may connect to a third leaf node which may indicate that the scenic metric is between 4 and 6. While the decision tree includes three leaf nodes and four branches, this is merely an example for ease of illustration only. Each decision tree may include any number of nodes, branches, and leaves, having any suitable number and/or types of tests on road segment characteristics and/or statistical measures.

In other implementations, the scenic route generation engine 68 obtains the scenic metrics for the road segments in the geographic area using alternative techniques. For example, the scenic metrics may be assigned to the road segments from crowd sourced data, such as surveys, reviews, or other crowdsourced data. In another example, the scenic route generation engine 68 may assign scenic metrics to the road segments using a set of rules. More specifically, the scenic route generation engine 68 may analyze the characteristics of a road segment to generate the scenic metric for the road segment. For example, the scenic route generation engine 68 may assign a score to each of the characteristics for the road segment, and may aggregate or combine the scores in any suitable manner. The scenic route generation engine 68 may then generate the scenic metric for the road segment based on the combined scores for the characteristics of the road segment. Each characteristic may be assigned a corresponding weight such that scores for some characteristics are weighted more heavily than others. In one example, the scenic route generation engine 68 may assign a first score to a road segment based on the distance from the road segment to the nearest landmark, may assign a second score to the road segment based on the size of the nearest landmark, and may assign a third score to the road segment based on the popularity metric for the landmark. The scenic route generation engine 68 may then weight, aggregate, and/or combine the first, second, and third scores in any suitable manner and may generate the scenic metric based on the combined scores.

When the scenic route generation engine 68 generates a scenic metric for a road segment for example, by applying characteristics of the road segment to the machine learning model, the scenic route generation engine 68 may store the scenic metric and/or an indication of the road segment in the database 80. In this manner, the scenic metric for the road segment may be retrieved from the database 80 when a user subsequently requests navigation directions within a geographic area including the road segment.

In other implementations, scenic metrics are generated for each road segment and stored in the database 80 for retrieval when a user requests navigation directions. In yet other implementations, scenic metrics of some of the road segments are stored in the database 80. When a user requests navigation directions within a geographic area, the scenic route generation engine 68 queries the database 80 for scenic metrics for road segments within the geographic area. If the database 80 does not include scenic metrics for road segments within the geographic area, the scenic route generation engine 68 obtains characteristics of the road segments and applies the characteristics of each road segment to the machine learning model to generate a scenic metric for the road segment. Then the scenic route generation engine 68 stores the scenic metric and/or an indication of the road segment in the database 80.

In addition to generating scenic metrics for road segments within the geographic area that includes the starting and destination locations, the scenic route generation engine 68 identifies a set of candidate routes for navigating from the starting location to the destination location. The candidate routes may include several road segments, and the scenic route generation engine 68 may obtain an estimated time period for traversing each candidate route and/or each road segment on each candidate route. For example, the scenic route generation engine 68 may obtain a set of candidate routes and estimated time periods for traversing the candidate routes from the navigation server 22, from the schematic and satellite database 30, and/or from the traffic database 36.

For each candidate route, the scenic route generation engine 68 obtains or generates the scenic metrics for the road segments within the candidate route. Then the scenic route generation engine 68 assigns a score to each road segment based on the scenic metric for the road segment and the estimated time period for traversing the road segment.

The scenic route generation engine 68 may assign a time score to the road segment based on the estimated time period for traversing the road segment. The time score may be proportional to the estimated time period for traversing the road segment, such that shorter estimated time periods have lower scores. The scenic route generation engine 68 may also assign a scenic score to the road segment based on the scenic metric for the road segment. The scenic score may be inversely proportional to the scenic metric for the road segment, such that road segments having higher scenic metrics may be assigned lower scenic scores. The scenic route generation engine 68 may then aggregate or combine the scores for the road segment in any suitable manner to generate an overall score for the road segment. The scenic route generation engine 68 may also aggregate or combine the overall scores for the road segments in any suitable manner to generate an overall score for the candidate route.

The scenic route generation engine 68 may then rank the candidate routes according to their overall scores and select the candidate route having the lowest overall score as the route to provide to the user. The scenic route generation engine 68 then transmits a set of navigation directions for presentation on the client device 12 for navigating from the starting location to the destination location via the selected route.

In other implementations, the scenic route generation engine 68 provides indications of each of the candidate routes to the client device 12 in a ranked order according to the respective overall scores. In this manner, the user may select one of the candidate routes for navigating to the destination location.

In addition to selecting a route based at least in part on the scenic metrics for the road segments along the route, the scenic route generation engine 68 may provide recommendations to the user for destination locations for presentation on the client device 12. The recommendations may be provided based on scenic metrics for the destination locations generated in the manner described above. For example, when in Los Angeles, a user may be a similar distance from both Long Beach Airport and Los Angeles International Airport. In response to a request for navigation directions to Los Angeles International Airport, the scenic route generation engine 68 may provide a recommendation for display on the client device 12 to travel to Long Beach Airport instead because Long Beach Airport is less crowded than Los Angeles International Airport.

Example Training Data for Generating the Machine Learning Model

FIG. 2 illustrates example training data 200 that may be used to generate the machine learning model. In some embodiments, the training data 200 may be stored in the database 80. The training data 200 may include three portions: an indication of the road segment 210, such as a road segment ID, characteristics of the road segment 220 including map feature data, and a scenic metric for the road segment 230. The indication of the road segment 210 may include a unique identifier 202 for the road segment. For example, the United States may include 400,000 road segments, where each road segment is assigned a different road segment ID 202. The characteristics of the road segment 220 may include map feature data for the road segment, such as the location 204 of the road segment, a distance 206 from the road segment to the nearest landmark or distances from the road segment to various landmarks within a threshold radius, the size 208 of the nearest landmark or various landmarks within the threshold radius, a visibility metric 212 for the nearest landmark or various landmarks within the threshold radius, and a popularity metric 214 for the nearest landmark or various landmarks within the threshold radius. The location 204 may be an intersection, street address, stretch of road (e.g., US 101 from mile marker 410 to mile marker 415, Main Street between State Street and North Street), or any other suitable location.

In some implementations, the scenic route generation engine 68 may identify landmarks within a threshold radius of the road segment from map data included in the map database 30 or from a landmark database that stores indications of landmarks and their corresponding locations. Then the scenic route generation engine 68 may determine distances from the landmarks to the road segment and identify the landmark with the shortest distance to the road segment. Landmarks may also be identified from reviews, blogs, search results, photo sharing platforms, etc., that include content related to a geographic area that includes the road segment. In some implementations, the scenic route generation engine 68 obtains data for a landmark which is referred to in the reviews, blogs, search results, photo sharing platforms, etc., with reference to the road segment or a location corresponding to the road segment.

The size 208 of the nearest landmark or various landmarks within the threshold radius may be the length, width, height, acreage, volume, depth, or any other suitable measure of the size of the landmark(s).

The visibility metric 212 may be a score for example from 1 to 10, may be a category selected from a set of categories such as visible, not visible, very visible, slightly visible, moderately visible, etc., or may be any suitable metric of the visibility of the landmark(s) from the road segment. The scenic route generation engine 68 may generate the visibility metric 212 for a landmark from the road segment by analyzing imagery from the map database 30 such as street level views of the landmark from a viewpoint corresponding to the location of the road segment. The scenic route generation engine 68 may analyze the imagery using computational geometry, such as ray tracing to identify obstacles between the road segment and the landmark to determine whether the view of the landmark from the road segment is obstructed. Then the scenic route generation engine 68 may determine the visibility metric based on an amount in which the view of the landmark is obstructed from the road segment according to the analysis.

In other implementations, the scenic route generation engine 68 may obtain indications of the visibility of the landmark from the road segment or from a location corresponding to the road segment from reviews, blogs, search results, photo sharing platforms, etc. For example, a review may indicate that the view of a particular landmark is obstructed from a road segment. In another example, the scenic route generation engine 68 may obtain photographs of the landmark for example, from a photo sharing platform.

For each photograph, the scenic route generation engine 68 may obtain an indication of the location of the user who took the photograph as well as comments and reviews of the photograph. Then the scenic route generation engine 68 may generate the visibility metric 212 based on the frequency in which photographs of the landmark were captured from the location corresponding to the road segment.

In other implementations, the scenic route generation engine 68 may generate the visibility metric 212 based on the reviews and/or comments for photographs of the landmark captured from the location corresponding to the road segment, or based on an analysis of the view of the landmark from the photographs captured from the location corresponding to the road segment. For example, the scenic route generation engine 68 may increase the visibility metric in response to obtaining photographs of the landmark captured from the location corresponding to the road segment with reviews and comments which commend the quality of the view. In another example, the scenic route generation engine 68 may decrease the visibility metric in response to obtaining photographs of the landmark captured from the location corresponding to the road segment, where the view is obstructed based on an analysis of the photograph.

In yet other implementations, the scenic route generation engine 68 may generate the visibility metric 212 based on any suitable combination of analyzing imagery from the map database 30 using computational geometry, and obtaining indications of the visibility of the landmark from reviews, blogs, search results, photo sharing platforms, etc.

The popularity metric 214 may be a score for example from 1 to 10, may be a category selected from a set of categories such as popular, not popular, very popular, slightly popular, moderately popular, etc., or may be any suitable metric of the popularity of the landmark(s). The scenic route generation engine 68 may generate the popularity metric 214 for a landmark by obtaining indications of the popularity of the landmark from reviews, blogs, search results, photo sharing platforms, etc. For example, the scenic route generation engine 68 may provide a query to a search engine for places to visit within the vicinity of the road segment. The popularity metric 214 for landmarks included in the top-ranked search results may be higher than landmarks which are not included in the top-ranked search results or not included in the search results at all.

In addition to map feature data, the characteristics of the road segment 220 may include the date and/or time 216 in which the scenic metric is assigned to the road segment. For example, some landmarks may be more popular during a particular time of year (e.g., a Christmas lights display, a Fourth of July celebration, etc.) or time of day (e.g., sunset over a mountain range). In this manner, the same road segment may receive different scenic metrics during different times of day or times of the year. The characteristics of the road segment 220 may also include terms 218 associated with the road segment or the location corresponding to the road segment. The terms 218 associated with the road segment may be descriptive of the view from the road segment. The scenic route generation engine 68 may identify the terms 218 associated with the road segment from reviews, blogs, search results, photo sharing platforms, etc., describing the view from the road segment or the location corresponding to the road segment. The scenic route generation engine 68 may obtain indications of terms descriptive of views from a database and may compare the terms from the database to terms included in the reviews, blogs, search results, photo sharing platforms, etc. to identify terms with the road segment. Additionally or alternatively, the scenic route generation engine 68 may identify terms 218 associated with the road segment using any suitable natural language processing techniques.

Moreover, the characteristics of the road segment 220 may include weather conditions and/or temperature data (not shown) for the road segment when the scenic metric is assigned to the road segment. The scenic route generation engine 68 may identify the weather conditions and/or temperature data for the road segment when the scenic metric is assigned to the road segment from a weather database. For example, some landmarks may be more difficult to see during foggy or rainy conditions. An air quality metric such as an Air Quality Index (AQI) may also be used as a characteristic of the road segment. When the air quality metric is above a threshold level, landmarks may become difficult to see. Additionally, when the temperature is undesirable users may be less likely to leave their vehicles to view the scenery. Accordingly, the weather, air quality, and/or temperature may have an effect on the quality of the view from the road segment.

In addition to an indication of the road segment 210 and characteristics of the road segment 220, the training data 200 includes a scenic metric 230. The scenic metric 230 may be a numerical scenic metric 222, for example from 1 to 10, may be a category selected from a set of categories such as scenic, not scenic, very scenic, slightly scenic, moderately scenic, etc., or may be any suitable metric of the quality of the view from the road segment. The scenic route generation engine 68 may obtain the scenic metric 222 from surveys, reviews, or other crowdsourced data. For example, to train the machine learning model users may rate the views from road segments with a score from 1 to 10, and the scenic metric for the road segment may be the score provided by a user for the road segment, an average of these scores for the road segment, or an average of these scores for a road segment on a particular date or during a particular time of day.

The scenic route generation engine 68 may analyze the training data 200 to generate the machine learning model. For example, the scenic route generation engine 68 may classify subsets of the training data 200 as corresponding to a particular scenic metric (e.g., 8), a range of scenic metrics (e.g., from 5-7), or a scenic metric category (e.g., scenic, not scenic, very scenic, slightly scenic, moderately scenic, etc.). Then the scenic route generation engine 68 may analyze each subset to generate the machine learning model. The machine learning model may be generated using various machine learning techniques such as linear regression, polynomial regression, logistic regression, random forests, boosting such as adaptive boosting, gradient boosting, and extreme gradient boosting, nearest neighbors, Bayesian networks, neural networks, support vector machines, or any other suitable machine learning technique.

Example Logic for Generating Scenic Metrics Using Machine Learning Techniques

Figure 3:
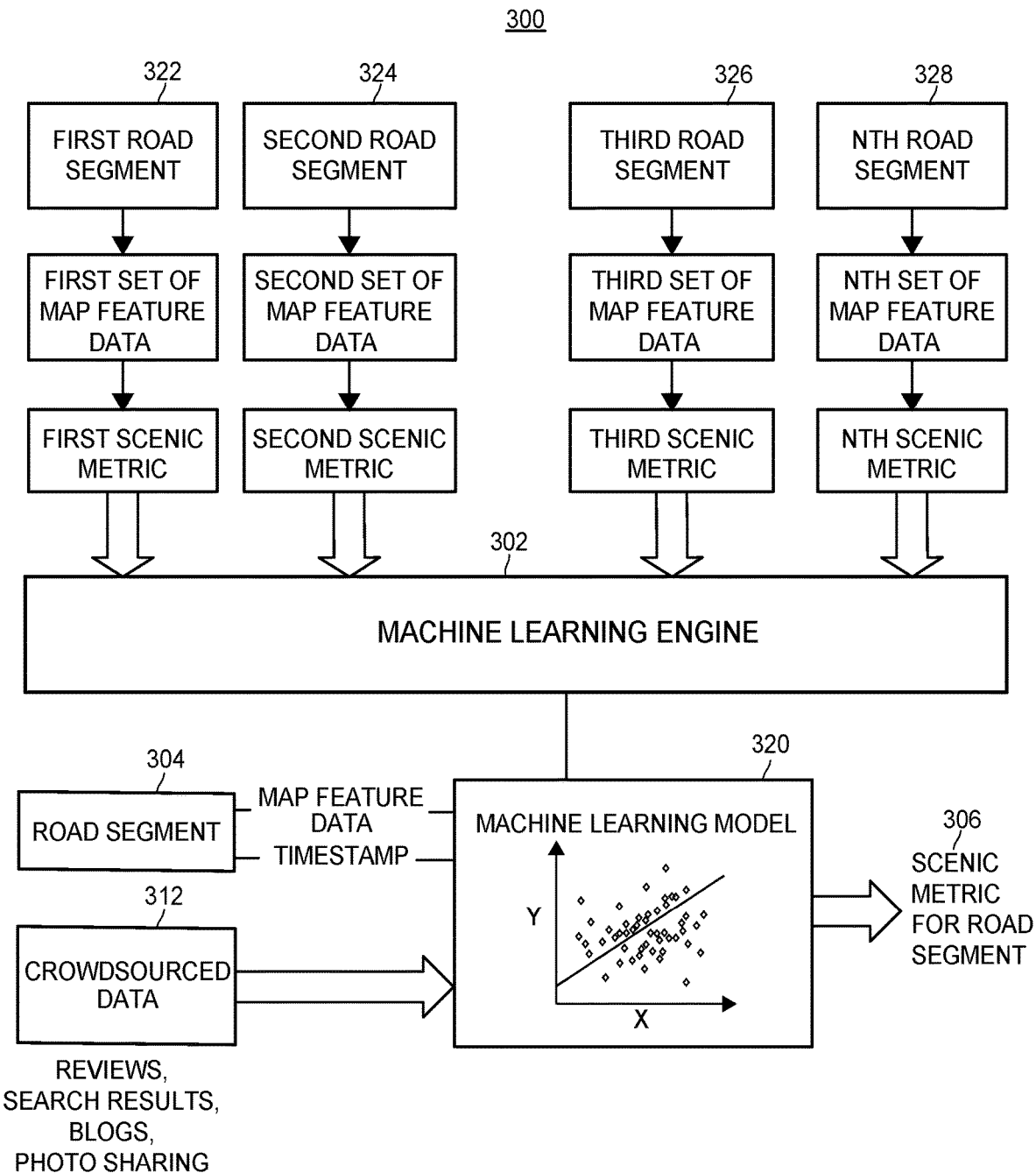
FIG. 3 illustrates a combined block and logic diagram that depicts the generation of a scenic metric for a road segment using a machine learning model.

FIG. 3 schematically illustrates how the scenic route generation engine 68 of FIG. 1 determines the scenic metric for each road segment in an example scenario. Some of the blocks in FIG. 3 represent hardware and/or software components (e.g., block 302), other blocks represent data structures or memory storing these data structures, registers, or state variables (e.g., blocks 304, 312, 320), and other blocks represent output data (e.g., block 306). Input signals are represented by arrows labeled with corresponding signal names.

The machine learning engine 302 of FIG. 3 may be included within the scenic route generation engine 68 to generate the machine learning model 320. To generate the machine learning model 320, the machine learning engine 302 receives training data including an indication of a first road segment 322 that has been assigned a scenic metric and characteristics of the first road segment 322 including map feature data for the first road segment 322. The training data also includes an indication of a second road segment 324 that has been assigned a scenic metric and characteristics of the second road segment 324 including map feature data for the second road segment 324. Furthermore, the training data includes an indication of a third road segment 326 that has been assigned a scenic metric and characteristics of the third road segment 326 including map feature data for the third road segment 326. Still further, the training data includes an indication of an nth road segment 328 that has been assigned a scenic metric and characteristics of the nth road segment 328 including map feature data for the nth road segment 328.

While the example training data includes indications of four road segments 322-328, this is merely an example for ease of illustration only. The training data may include any number of road segments assigned scenic metrics by any number of users.

The machine learning engine 302 then analyzes the training data to generate a machine learning model 320 for generating a scenic metric for a road segment. While the machine learning model 320 is illustrated as a linear regression model, the machine learning model may be another type of regression model such as a logistic regression model, a decision tree, several decision trees, a neural network, a hyperplane, or any other suitable machine learning model.

In any event, in response to a request for navigation directions by a user, the system of FIG. 3 obtains a set of candidate routes including road segments on each of the candidate routes or obtains a set of road segments for a geographic area that includes the starting location and/or destination location for the navigation directions. For each road segment 304, the system obtains characteristics of the road segment including map feature data for the road segment and a timestamp indicating the date and/or time in which the navigation directions are requested. The system also obtains characteristics of the road segment 304 through crowdsourced data 312, such as reviews, search results, blogs, photographs and/or related information from photo sharing platforms, etc. The crowdsourced data 312 may provide information regarding the visibility of landmarks from the road segment for generating the visibility metric, the popularity of the landmarks for generating the popularity metric, and/or terms associated with the road segment.

The machine learning engine 302 may then apply the characteristics of the road segment 304 including the map feature data, the timestamp, and the crowdsourced data 312 to the machine learning model 320 to generate the scenic metric for the road segment. The scenic route generation engine 68 may then store an indication of the road segment and the scenic metric in the database 80.

To select a route for navigating from the starting location to a destination location, the scenic route generation engine 68 may receive a set of candidate routes from the navigation server 22, where each of the candidate routes may be used to navigate from the starting location to the destination location. In addition to receiving the set of candidate routes, the scenic route generation engine 68 obtains indications of road segments within a geographic area that includes the starting location and the destination location, a scenic metric for each road segment and an estimated time period for traversing the road segment based on the length of the road segment and/or current traffic data.

The scenic route generation engine 68 may then assign an overall score or metric to each road segment based on the scenic metric and/or the estimated time period for traversing the road segment. For example, for a particular road segment the scenic route generation engine 68 may aggregate or combine a time score for the road segment based on the estimated time period for traversing the road segment, and a scenic score for the road segment based on the scenic metric for the road segment in any suitable manner to generate the overall score for the road segment.

Then the scenic route generation engine 68 may select a route for navigating from the starting location to the destination location using a pathfinding algorithm, where each road segment is assigned a weight corresponding to the overall score for the road segment. In some implementations, the scenic route generation engine 68 traverses each path or candidate route from the starting location to the destination location using the road segments in the geographic area and their corresponding weights to identify a path or route having the lowest combined weight. In other implementations, the scenic route generation engine 68 traverses each path or candidate route from the starting location to the destination location using the road segments in the geographic area and their corresponding weights to identify a threshold number of paths or routes (e.g., five) having the lowest combined weights for presenting the identified routes in a ranked order according to the combined weights. In yet other implementations, the scenic route generation engine 68 obtains a set of candidate routes from the navigation server 22. The scenic route generation engine 68 then traverses each candidate route from the starting location to the destination location using the road segments on the candidate route and their corresponding weights to identify a route of the set of candidate routes having the lowest combined weight.

For example, beginning at the starting location each of the road segments in the geographic area are included in a set of candidate road segments. The scenic route generation engine 68 may identify a road segment having the lowest weight (e.g., having the lowest overall score) which is connected to the starting location and may remove the identified road segment from the set. Next, the scenic route generation engine 68 identifies a road segment remaining in the set having the lowest weight which is connected to the previously identified road segment and removes the identified road segment from the set. This process is repeated until the destination location is reached. When the destination location is reached, the scenic route generation engine 68 identifies the set of identified road segments as a candidate route.

This process is then repeated for road segments which were not selected in the first iteration. In a second iteration, the scenic route generation engine 68 identifies a second candidate route including a second set of road segments for traversing from the starting location to the destination location. After the scenic route generation engine 68 has selected each of the road segments the process is completed. The scenic route generation engine 68 then compares the candidate routes and selects the candidate route having the lowest combined weight as the route.

Figure 4:
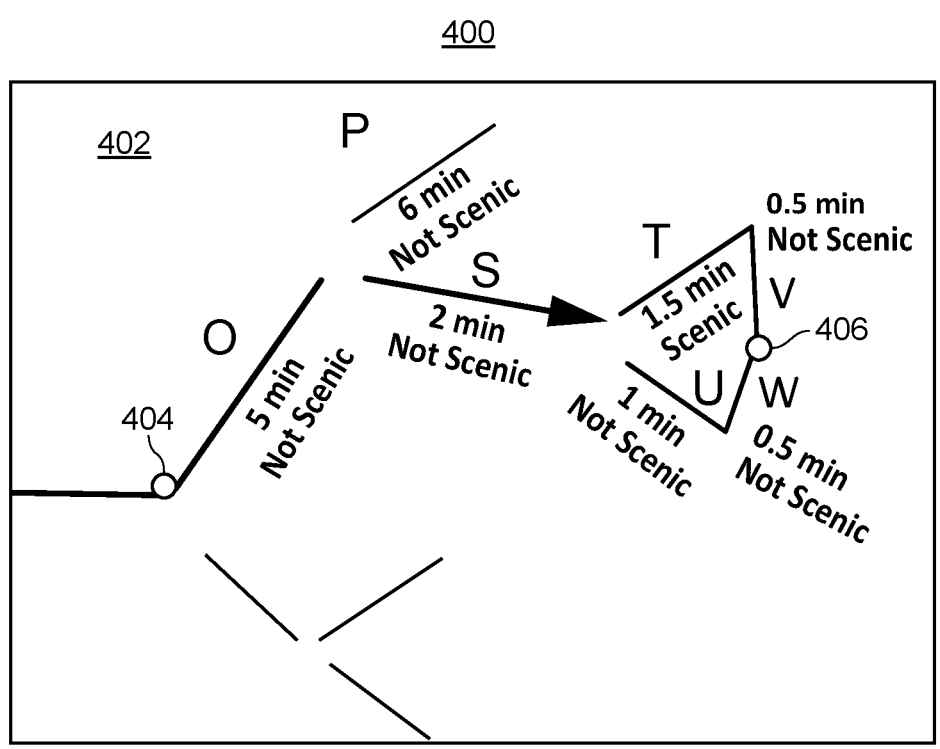
FIG. 4 illustrates an example graph for selecting a navigation route to the destination location using a least-cost path analysis based on estimated time periods for traversing road segments and scenic metrics for the road segments.

FIG. 4 illustrates an example display 400 of a geographic area 402 including the starting location 404 and the destination location 406 and having road segments O, P, S, T, U, V, and W. The scenic route generation engine 68 may analyze the road segments to identify one or more routes from the starting location 404 to the destination location 406. Each road segment is assigned a weight corresponding to the overall score for the road segment. The overall score may be based on any suitable combination of the estimated time period for traversing the road segment and a scenic metric for the road segment.

For example, road segment O may have a weight of 5 corresponding to an overall score of 5 based on an estimated time period for traversing road segment O of 5 minutes and a scenic score of 1 based on a scenic metric of "Not Scenic." Road segment P may have a weight of 6 corresponding to an overall score of 6 based on an estimated time period for traversing road segment P of 6 minutes and a scenic score of 1 based on a scenic metric of "Not Scenic." Road segment S may have a weight of 2 corresponding to an overall score of 2 based on an estimated time period for traversing road segment S of 2 minutes and a scenic score of 1 based on a scenic metric of "Not Scenic." Road segment T has a weight of 0.75 corresponding to an overall score of 1.5 based on an estimated time period for traversing road segment T of 1.5 minutes and a scenic score of 0.5 based on a scenic metric of "Scenic." Road segment U has a weight of 1 based on an estimated time period for traversing road segment U of 1 minute and a scenic score of 1 based on a scenic metric of "Not Scenic." Road segments V and W have weights of 0.5 corresponding to overall scores of 0.5 based on estimated time periods for traversing road segments V and W of 0.5 minutes and scenic scores of 1 based on a scenic metric of "Not Scenic."

Accordingly, the scenic route generation engine 68 may determine that the combined weight is the lowest for a candidate route including road segments O, S, T, and V. The combined weight for the candidate route including road segments O, S, T, and V is 8.25 while the combined weight for the candidate route including road segments O, S, U, and W is 8.5. This is the case even though the combined estimated time period for traversing road segments O, S, T, and V is higher (9 minutes) than the combined estimated time period for traversing road segments O, S, U and W (8.5 minutes), because the scenic score for road segment T decreases the overall score for road segment T.

While the example road segments O, P, S, T, U, V, and W in the example display 400 have weights based on estimated time periods for traversing the road segments and scenic metrics, this is merely one example for ease of illustration only. The weights for each road segment may also be based on any other suitable metric for the road segment.

After selecting a route from the set of candidate routes having the lowest combined weight or selecting a threshold number of routes from the set of candidate routes having the lowest combined weights, the scenic route generation engine 68 may provide a set of navigation directions for traveling from the starting location to the destination location along the selected route to the client device 12.

Moreover, the scenic route generation engine 68 may provide alternative sets of navigation directions for traveling from the starting location to the destination location along alternative routes to the client device 12, where one alternative route may be the fastest route from the starting location to the destination location, another alternative route may be the most scenic route from the starting location to the destination location according to the scenic metrics, and yet another alternative route may be selected based on a combination of the estimated time periods for traversing the road segments and the scenic metrics for the road segments, as described above. The user may select a user control on the client device 12 indicating a preference for the fastest route or for the scenic route. In some implementations, the client device 12 may automatically identify that the user is travelling. For example, the user may enter a home location via user controls on the navigation application 14. When the user's current location is more than a threshold distance from her home location, the client device 12 may automatically determine that the user is travelling. In response to determining that the user is travelling, the client device 12 may transmit a request for navigation directions with a preference for a scenic route to the scenic route generation server 60. The digital navigation module 44 may then present a navigation display on the client device 12 with indications of multiple sets of navigation directions for travelling along different routes from the starting location to the destination location for the user to choose from via user controls. In other implementations, the digital navigation module 44 may present a navigation display on the client device 12 with a single set of navigation directions for travelling along a route selected by the scenic route generation server 60 based at least in part on the scenic metrics for the road segments on the selected route.

Figure 5:
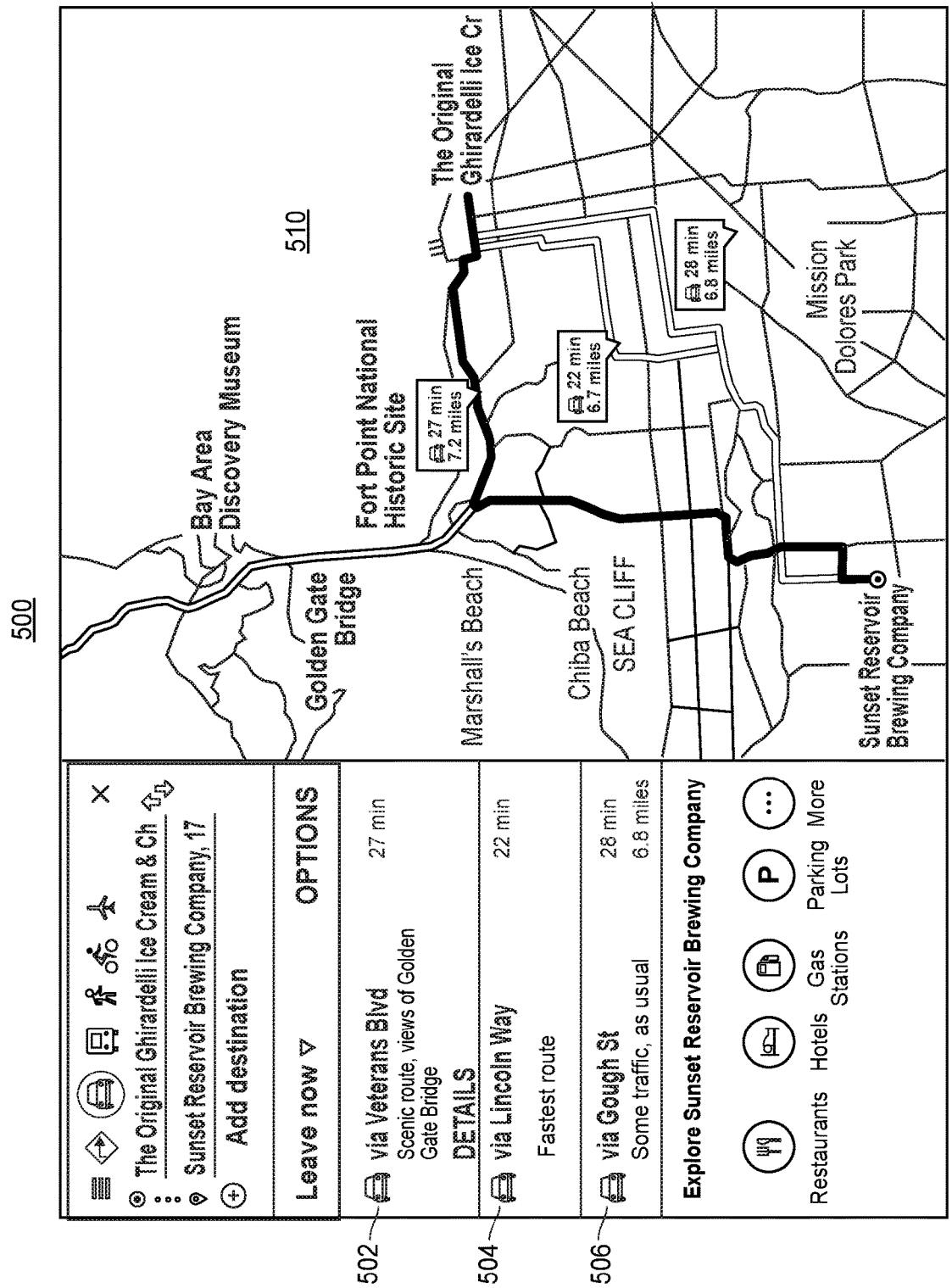
FIG. 5 illustrates an example navigation display indicating several routes from the starting location to the destination location for the user to select from which are presented in a ranked order.

FIG. 5 illustrates an example navigation display 500 which may be presented on the client device 12. The navigation display 500 indicates several routes 502-506 from the starting location to the destination location for the user to select from which are presented in a ranked order. For example, in response to a request for navigation directions from The Original Ghirardelli to Sunset Reservoir Brewing Company in San Francisco, the scenic route generation engine 68 may select a threshold number of routes (e.g., 3) from a set of candidate routes having the lowest combined weights, and may rank the threshold number of routes in order of combined weight, where the route having the lowest combined weight may be ranked the highest. Then the scenic route generation engine 68 may provide sets of navigation directions including indications of the selected routes to the digital navigation module 44 to present on the navigation display 500. Each indication of a route 502-506 includes a description of the road segments along the route (e.g., via Veterans Blvd), an indication of the estimated time period for traversing the route, and/or a description of the route (e.g., "Scenic route, views of Golden Gate Bridge," "This route is 10 minutes longer than the fastest route, but is an easier and much prettier drive," "View the sunset behind the mountains from this route," etc.). The description of the route may include descriptions of scenic views including the landmarks which are visible from the route. The description may also include recommendations to exit the vehicle at certain points along the route, for example to take photographs or to have a better view of the landmark from a location which is inaccessible from a vehicle.

In the navigation display 500, the highest ranked route 502 does not have the shortest estimated time period for travelling from The Original Ghirardelli to Sunset Reservoir Brewing Company. Instead, the second highest ranked route 504 has the shortest estimated time period for travelling from The Original Ghirardelli to Sunset Reservoir Brewing Company but is not as scenic as the highest ranked route 502, which has views of the Golden Gate Bridge from the route 502. Accordingly, the combined score/weight for the second highest ranked route 504 exceeds the combined score/weight for the highest ranked route 502 despite having a shorter estimated time period of traversal.

In response to the user selecting one of the indications of the routes 502-506 via a user control, such as touch-selecting or clicking on an indication of one of the routes 502-506, the navigation display 500 may present an indication of the selected route within the map view 510. For example, the navigation display 500 may highlight the selected route within the map view 510. In the example navigation display 500, the highest ranked route 502 is selected and highlighted in the map view 510. In addition to presenting user controls for entering a starting location and a destination location, the navigation display 500 may include a user control for indicating a preference for the fastest route, the scenic route, the route with the shortest distance, etc.

The navigation display 500 may also include user controls for sharing a route with other users by sending the navigation directions to client devices of other users. The navigation application 14 or the scenic route generation server 60 may also store sets of navigation directions that have been generated for the user, so that the user may receive the same set of navigation directions when travelling to the destination location another time.

As described above, in addition to providing navigation directions from a starting location to a destination location, the navigation application 14 may include user controls for requesting a tour around a geographic area, such as a city from a starting location. The user may enter a starting location or the starting location may be the user's current location. Additionally, the user may select the geographic area (e.g., San Francisco) or the navigation application 14 may automatically select the geographic area based on the user's current location. For example, if the user is in a particular city and requests a tour, the navigation application 14 may automatically determine that the user is requesting a tour of the particular city. In response to receiving a request for a tour of a geographic area from a starting location, the scenic route generation engine 68 may obtain indications of road segments within the geographic area, for example from the map database 30. Then for each road segment within the geographic area, the scenic route generation engine 68 may generate a scenic metric for the road segment. For example, the scenic route generation engine 68 may determine whether a scenic metric has been generated for the road segment by attempting to retrieve the scenic metric for the road segment from the database 80. If the scenic metric for a road segment is not in the database 80 or the scenic metric has not been updated in longer than a threshold duration, the scenic route generation engine 68 may apply characteristics of the road segment to the machine learning model to generate the scenic metric for the road segment. In other implementations, the scenic route generation engine 68 obtains the scenic metrics for the road segments in the geographic area using alternative techniques, such as assigning scores to each of the characteristics of a road segment.

In any event, the scenic route generation engine 68 may then rank the road segments in the geographic area according to their scenic metrics and select a subset of road segments ranked above a threshold ranking (e.g., the top five road segments) to include in the tour of the geographic area. In other implementations, the scenic route generation engine 68 may compare the scenic metrics for the road segments to a threshold metric and select a subset of road segments having scenic metrics above threshold metric to include in the tour of the geographic area. Then the scenic route generation engine 68 may generate a route beginning and ending at the starting location and including each of the selected road segments. To generate the route, the scenic route generation engine 68 may use a pathfinding algorithm for a multi-destination route having each of the selected road segments as intermediate destinations and the starting location as the final destination. To determine the order of the intermediate destinations, the scenic route generation engine 68 may use a traveling salesman problem (TSP) solver, such as a Concorde TSP solver, where each of the road segments between the starting location, the intermediate destinations, and the final destination are assigned weights according to their corresponding overall scores or time scores. The scenic route generation engine 68 may select the route having the lowest combined weight while arriving at each of the intermediate destinations and the final destination.

Figure 6:
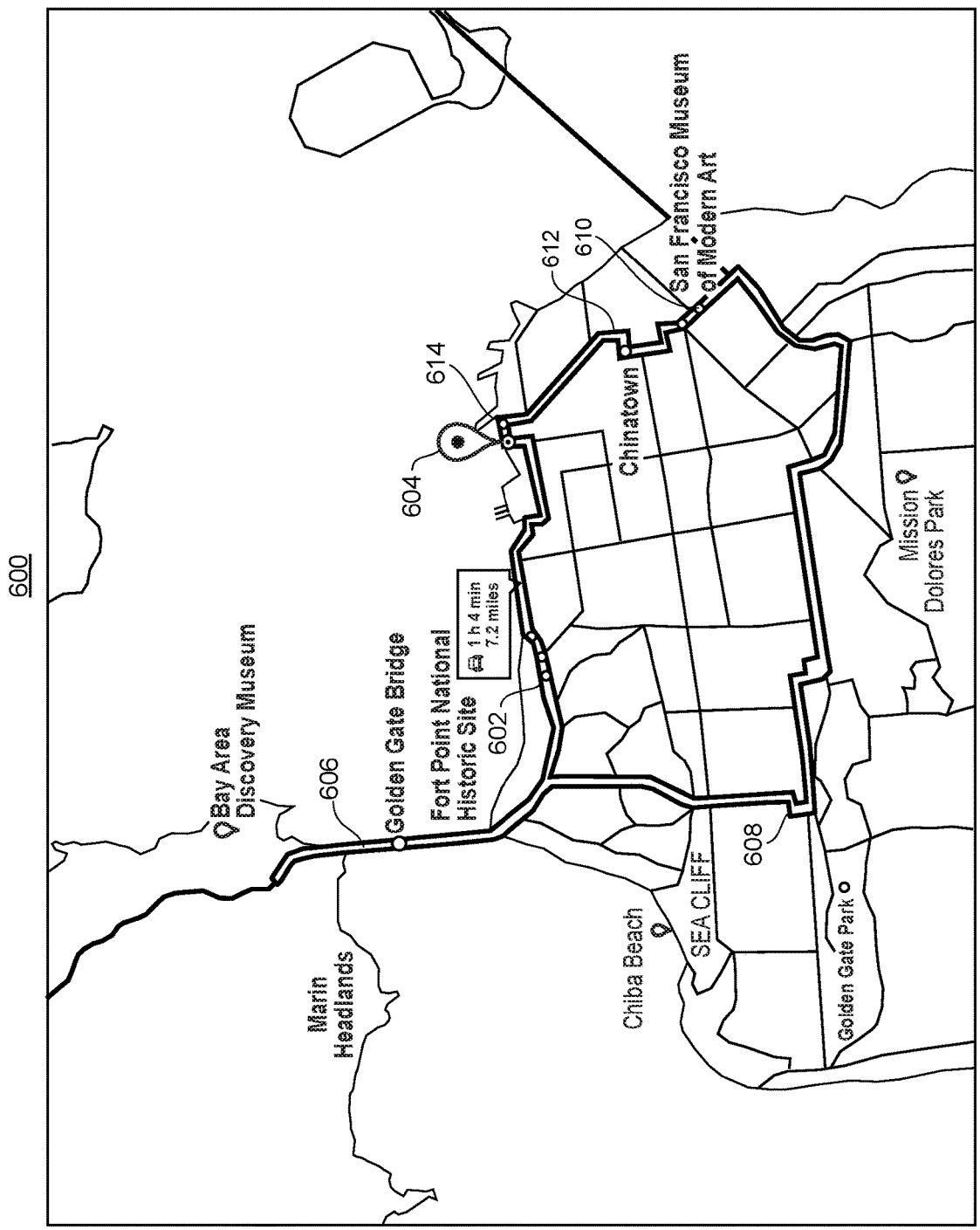
FIG. 6 illustrates another example navigation display indicating a route for touring a geographic area beginning and ending at a starting location.

FIG. 6 illustrates an example navigation display 600 which may be presented on the client device 12. The navigation display 600 indicates a route 602 for navigating on a tour of a geographic area (e.g., San Francisco) beginning and ending at a starting location 604 (e.g., Argonaut Hotel). The route 602 includes road segments with views of Golden Gate Bridge 606, Golden Gate Park 608, San Francisco Museum of Modern Art 610, Chinatown 612, and Fisherman's Wharf 614. Each of these road segments may be ranked above a threshold ranking according to their respective scenic metrics or may have scenic metrics above a threshold metric. In this manner, the user may experience a tour around the geographic area based on the most scenic road segments in the geographic area.

Figure 7:
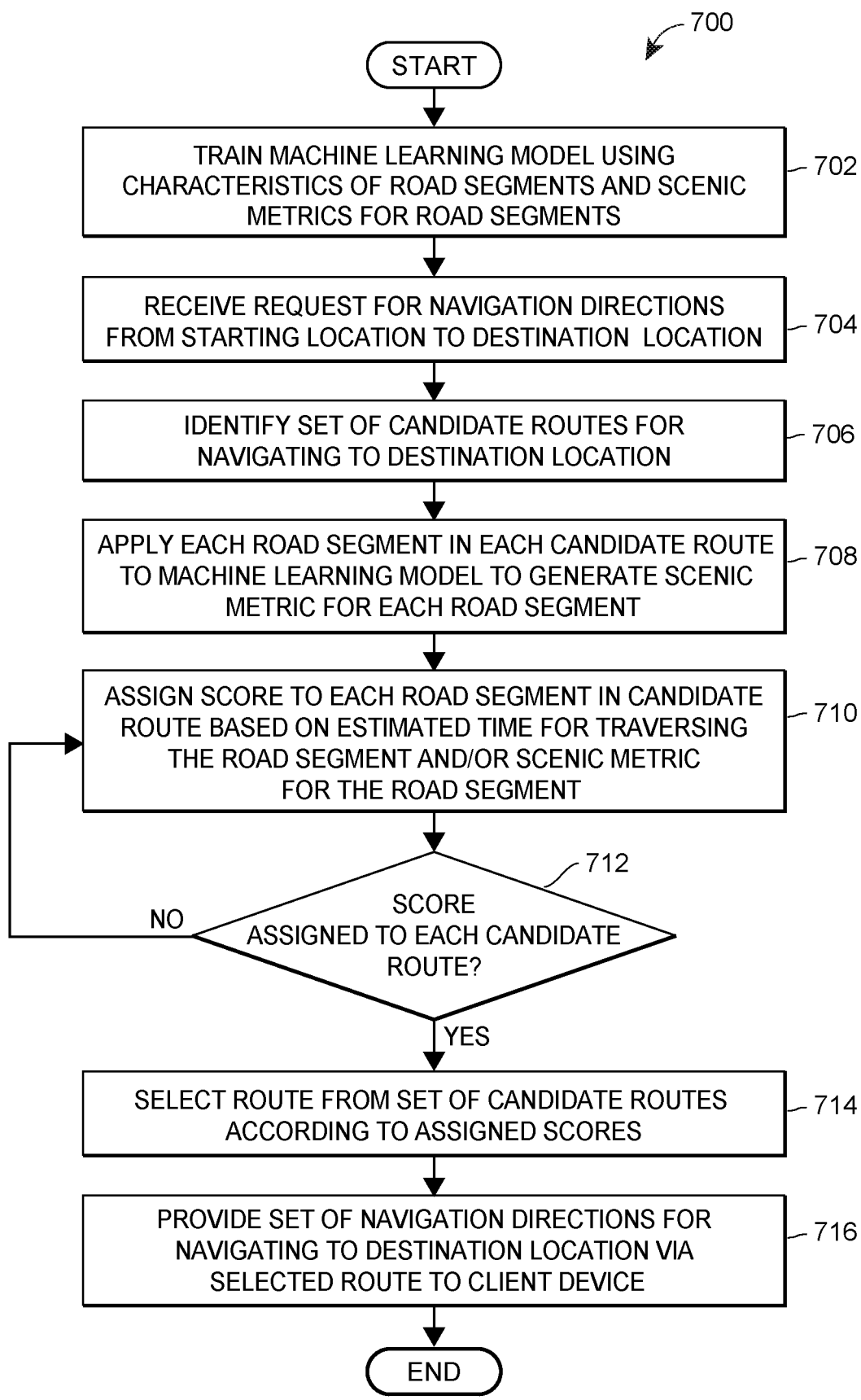
FIG. 7 is a flow diagram of an example method for generating a set of navigation directions according to scenic metrics of road segments, which may be implemented in a server device.

FIG. 7 illustrates an example method 700 for generating a set of navigation directions according to scenic metrics of road segments, which can be implemented at a network server (such as the scenic route generation server 60), for example. The method can be implemented in a set of instructions stored on a computer-readable memory and executable at one or more processors of the scenic route generation server 60. For example, the method can be implemented by the scenic route generation engine 68.

At block 702, the scenic route generation server 60 trains a machine learning model for generating scenic metrics of road segments which have not been assigned a scenic metric using (i) characteristics of road segments that have been assigned a scenic metric and (ii) the scenic metrics for the road segments as training data. The characteristics of the road segments may include map feature data, such as the location of the road segment, the length of the road segment, distances from the road segment to various landmarks and/or a distance from the road segment to the nearest landmark, a size of the nearest landmark, a visibility metric indicative of visibility of the nearest landmark from the road segment, a popularity metric indicative of popularity of the landmark, etc. The characteristics of a road segment may also include the date and/or time in which the scenic metric is assigned to the road segment. The date and/or time in which the scenic metric is assigned to the road segment may be compared to sunset/sunrise times at the location of road segment, for example to determine the time of day in which the scenic metric is assigned for comparison to other times on other dates. Furthermore, the characteristics of the road segment may include weather conditions, an air quality metric, and/or temperature data when the scenic metric is assigned to the road segment. Additionally, the characteristics of the road segment may include terms associated with the road segment including terms associated with the location corresponding to the road segment from reviews, blogs, search results, photo sharing platforms, etc.

In some implementations, each of the road segments may be classified according to the scenic metric assigned to the road segment (e.g., a first set of road segments having a first scenic metric or range of scenic metrics may be classified into a first group, a second set of road segments having a second scenic metric or range of scenic metrics may be classified into a second group, etc.). The scenic route generation server 60 may then analyze the characteristics of the road segments in each group to generate the machine learning model. The scenic metric may be a score for example from 1 to 10, may be a category selected from a set of categories such as scenic, not scenic, very scenic, slightly scenic, moderately scenic, etc., or may be any suitable metric of the quality of the view from the road segment.

The machine learning model may include a set of characteristic values for each scenic metric (e.g., 8), range of scenic metrics (e.g., from 5-7), or scenic metric category (e.g., scenic, not scenic, very scenic, slightly scenic, moderately scenic, etc.). The set of characteristic values may be an average visibility metric for the particular scenic metric, a maximum visibility metric for the particular scenic metric, an average distance from the road segment to the nearest landmark for the particular scenic metric, a standard deviation, variation, or range of the distances from the road segment to the nearest landmark for the particular scenic metric, an average popularity metric of the nearest landmark for the particular scenic metric, a set of terms associated with road segments having the particular scenic metric, etc.

At block 704, a request is received for navigation directions from a starting location to a destination location. Then the scenic route generation server 60 identifies a set of candidate routes for navigating from the starting location to the destination location (block 706). Each candidate route may include several road segments. In some implementations, the scenic route generation server 60 provides the starting location and the destination location to the navigation server 22 and receives the set of candidate routes from the navigation server 22. In other implementations, the scenic route generation server 60 retrieves map data from the schematic and satellite database 30 for a geographic area which includes the starting location and the destination location and identifies candidate routes as sets of road segments within the geographic area for traversing from the starting location to the destination location.

The scenic route generation server 60 may then obtain characteristics of the road segments within the set of candidate routes which have not been assigned scenic metrics. For example, the characteristics may be obtained from a map data server that stores map feature data, from a photo sharing server indicating locations of viewpoints for photographs, from reviews, blogs, search results, from a weather database, etc. The scenic route generation server 60 may apply the characteristics of a road segment to the machine learning model using machine learning techniques (block 708). The machine learning techniques may include linear regression, polynomial regression, logistic regression, random forests, boosting such as adaptive boosting, gradient boosting, and extreme gradient boosting, nearest neighbors, Bayesian networks, neural networks, support vector machines, or any other suitable machine learning technique.

When the scenic route generation server 60 generates a scenic metric for a road segment by applying characteristics of the road segment to the machine learning model, the scenic route generation server 60 may store the scenic metric and/or an indication of the road segment in the database 80. In this manner, the scenic metric for the road segment may be retrieved from the database 80 when a user subsequently requests navigation directions within a geographic area including the road segment.

Then the scenic route generation server 60 may assign an overall score to each road segment in a candidate route (block 710). The overall score may be based on any suitable combination of a time score for the road segment based on the estimated time period for traversing the road segment, and a scenic score for the road segment based on the scenic metric for the road segment. The scenic route generation server 60 may combine the scores in any suitable manner to generate the overall score for the road segment. Then the scenic route generation server 60 may use the overall score as a weight for performing a least-cost path analysis to identify the route of the set of candidate routes having the lowest combined weight.

At block 712, the scenic route generation server 60 determines whether an overall score has been assigned to each of the road segments on each of the candidate routes. If overall scores for road segments on one of the candidate routes have not been assigned, the scenic route generation server 60 continues to assign scores to the road segments (block 710). Otherwise, the scenic route generation server 60 selects a route from the set of candidate routes according to the overall scores for the road segments (block 714). For example, the scenic route generation server 60 may select a route having the lowest combined weight, where each road segment along the route is assigned a weight corresponding to the overall score for the road segment.

Then at block 716, the scenic route generation server 60 provides a set of navigation directions for navigating from the starting location to the destination location via the selected route to the client device 12. The client device 12 may then present an indication of the selected route on a navigation display, such as the navigation display 500 as shown in FIG. 5.

Figure 8:
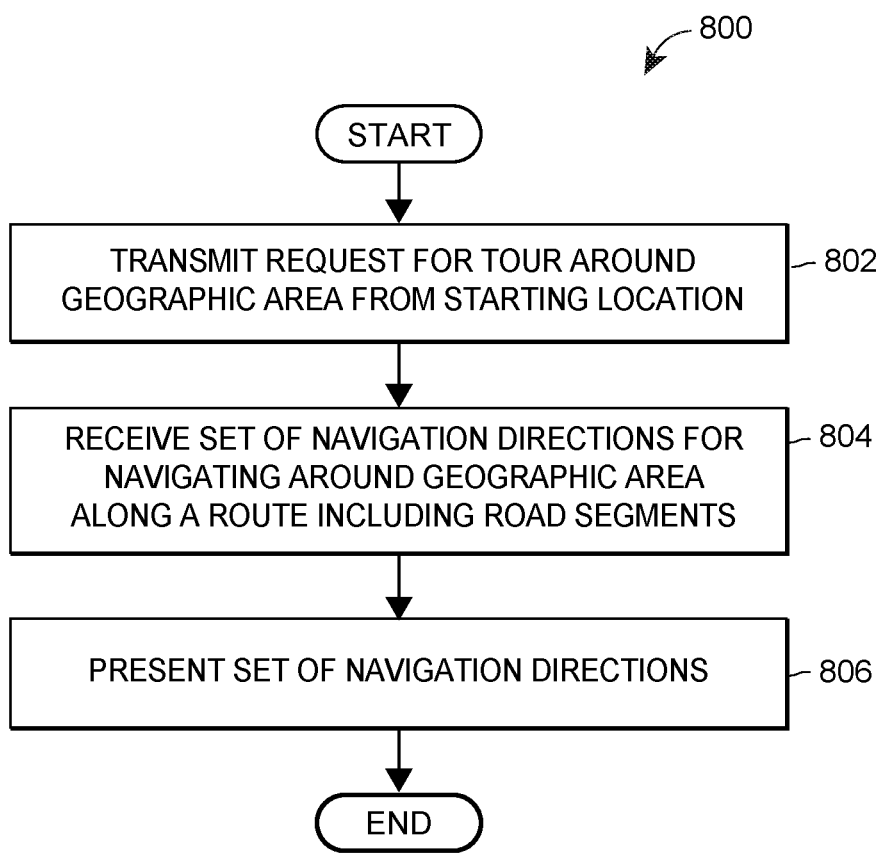
FIG. 8 is a flow diagram of an example method for presenting a set of navigation directions for providing a tour of a geographic area, which may be implemented in a client device.

FIG. 8 illustrates an example method 800 for presenting a set of navigation directions for providing a tour of a geographic area, which can be implemented at a client device (such as the client device 12), for example. The method can be implemented in a set of instructions stored on a computer-readable memory and executable at one or more processors of the client device 12. For example, the method can be implemented by the digital navigation module 44.

At block 802, the client device 12 transmits a request for a tour around a geographic area from a starting location to a server device, such as the scenic route generation server 60. For example, the navigation application 14 executing on the client device 12 may include user controls for requesting a tour around a geographic area, such as a city from a starting location. The user may enter a starting location or the starting location may be the user's current location. Additionally, the user may select the geographic area (e.g., San Francisco) or the navigation application 14 may automatically select the geographic area based on the user's current location. For example, if the user is in a particular city and requests a tour, the navigation application 14 may automatically determine that the user is requesting a tour of the particular city.

In response to receiving a request for a tour of a geographic area from a starting location, the scenic route generation engine 68 may obtain indications of road segments within the geographic area, for example from the map database 30. Then for each road segment within the geographic area, the scenic route generation engine 68 may generate a scenic metric for the road segment. For example, the scenic route generation engine 68 may determine whether a scenic metric has been generated for the road segment by attempting to retrieve the scenic metric for the road segment from the database 80. If the scenic metric for a road segment is not in the database 80 or the scenic metric has not been updated in longer than a threshold duration, the scenic route generation engine 68 may apply characteristics of the road segment to the machine learning model to generate the scenic metric for the road segment.

In any event, the scenic route generation engine 68 may then rank the road segments in the geographic area according to their scenic metrics and select a subset of road segments ranked above a threshold ranking (e.g., the top five road segments) to include in the tour of the geographic area. In other implementations, the scenic route generation engine 68 may compare the scenic metrics for the road segments to a threshold metric and select a subset of road segments having scenic metrics above threshold metric to include in the tour of the geographic area. Then the scenic route generation engine 68 may generate a route beginning and ending at the starting location and including each of the selected road segments. To generate the route, the scenic route generation engine 68 may use a pathfinding algorithm for a multi-destination route having each of the selected road segments as intermediate destinations and the starting location as the final destination. To determine the order of the intermediate destinations, the scenic route generation engine 68 may use a traveling salesman problem (TSP) solver, such as a Concorde TSP solver, where each of the road segments between the starting location, the intermediate destinations, and the final destination are assigned weights according to their corresponding overall scores or time scores. The scenic route generation engine 68 may select the route having the lowest combined weight while arriving at each of the intermediate destinations and the final destination.

Then at block 804, the client device 12 receives a set of navigation directions for navigating around the geographic area along the selected route from the scenic route generation server 60. The selected route may include a subset of selected road segments as intermediate destinations for the tour.

At block 806, the client device 12 presents the set of navigation directions on the user interface 58, such as on a navigation display. The set of navigation directions may be presented on the navigation display by highlighting road segments on the navigation display which are on the route corresponding to the set of navigation directions, as shown in the navigation display 600 in FIG. 6.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for generating navigation directions according to scenic metrics of road segments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for selecting a scenic route in response to a request for navigation directions, the method comprising:
   training, by one or more processors, a machine learning model using (i) map feature data for each of a plurality of road segments, and (ii) a scenic metric for each of the plurality of road segments indicative of a quality of a view from the road segment including classifying each of the plurality of road segments into a subset of a plurality of subsets of road segments each having a corresponding scenic metric or range of scenic metrics, and analyzing the map feature data for each subset of road segments to generate the machine learning model;
   receiving, by the one or more processors, a request for navigation directions from a starting location to a destination location;
   identifying, by the one or more processors, a set of candidate routes for navigating from the starting location to the destination location;

for each road segment on each candidate route in the set of candidate routes:
  obtaining, by the one or more processors, map feature data for the road segment; and
  applying, by the one or more processors, the machine learning model to the map feature data for the road segment to generate a scenic metric for the road segment;
selecting, by the one or more processors, a route from the set of candidate routes based at least in part on the scenic metrics for each candidate route; and
providing, by the one or more processors, a set of navigation directions for presentation on a client device for navigating from the starting location to the destination location via the selected route.

2. The method of claim 1, further comprising:
training, by the one or more processors, the machine learning model further based on a date or time in which the scenic metric is obtained for each road segment; and
applying, by the one or more processors, a date or time in which the navigation directions are requested to the machine learning model to generate the scenic metric for the road segment.

3. The method of claim 1, further comprising:
training, by the one or more processors, the machine learning model further based on one or more terms associated with each road segment; and
for each road segment on each candidate route in the set of candidate routes:
  obtaining, by the one or more processors, one or more terms associated with the road segment; and
  applying, by the one or more processors, the one or more terms to the machine learning model to generate the scenic metric for the road segment.

4. The method of claim 1, further comprising:
obtaining, by the one or more processors, for at least one of the road segments on at least one candidate route in the set of candidate routes, a visibility metric indicative of visibility of a landmark from the road segment; and
adjusting, by the one or more processors, the scenic metric based on the obtained indication.

5. The method of claim 1, wherein selecting a route from the set of candidate routes based at least in part on the scenic metrics for each candidate route includes:
for each candidate route:
  assigning, by the one or more processors, a score to each road segment within the candidate route based at least in part on the scenic metric of the road segment;
  combining, by the one or more processors, the scores for each road segment within the candidate route to generate an overall score; and
selecting, by the one or more processors, the route from the set of candidate routes according to the overall score for each respective candidate route.

6. The method of claim 5, wherein assigning a score to each road segment within the candidate route based at least in part on the scenic metric of the road segment includes:
assigning, by the one or more processors, a score to each road segment within the candidate route based on an estimated amount of time for traversing the road segment; and
adjusting, by the one or more processors, the score for each road segment based on the scenic metric for the road segment.

7. The method of claim 1, wherein the map feature data for each of the plurality of road segments includes at least one of: a location of the road segment, a distance from the road segment to a nearest landmark, a size of the nearest landmark, a visibility metric indicative of visibility of the nearest landmark from the road segment, or a popularity metric indicative of popularity of the landmark.

8. The method of claim 1, wherein receiving a request for navigation directions from a starting location to a destination location includes receiving a request for a tour around a geographic area beginning and ending at the starting location, and further comprising:
for each road segment in the geographic area:
  obtaining, by the one or more processors, map feature data for the road segment; and
  applying, by the one or more processors, the machine learning model to the map feature data for the road segment to generate a scenic metric for the road segment; and
selecting, by the one or more processors, a route based at least in part on the scenic metrics for each road segment in the geographic area.

9. The method of claim 8, wherein selecting a route based at least in part on the scenic metrics for each road segment in the geographic area includes:
identifying, by the one or more processors, a set of road segments each having a scenic metric above a threshold metric; and
selecting, by the one or more processors, a route including each of the set of road segments and one or more additional road segments for traversing the set of road segments beginning and ending at the starting location.

10. A computing device for selecting a scenic route in response to a request for navigation directions, the computing device comprising:
one or more processors; and
a non-transitory computer-readable memory coupled to the one or more processors and storing instructions thereon that, when executed by the one or more processors, cause the computing device to:
  train a machine learning model using (i) map feature data for each of a plurality of road segments, and (ii) a scenic metric for each of the plurality of road segments indicative of a quality of a view from the road segment, including classifying each of the plurality of road segments into a subset of a plurality of subsets of road segments each having a corresponding scenic metric or range of scenic metrics, and analyzing the map feature data for each subset of road segments to generate the machine learning model;
  receive a request for navigation directions from a starting location to a destination location;
  identify a set of candidate routes for navigating from the starting location to the destination location;
  for each road segment on each candidate route in the set of candidate routes:
    obtain map feature data for the road segment; and
    apply the machine learning model to the map feature data for the road segment to generate a scenic metric for the road segment;
  select a route from the set of candidate routes based at least in part on the scenic metrics for each candidate route; and provide a set of navigation directions for presentation on a client device for navigating from the starting location to the destination location via the selected route.

11. The computing device of claim 10, wherein the instructions further cause the computing device to:
train the machine learning model further based on a date or time in which the scenic metric is obtained for each road segment; and
apply a date or time in which the navigation directions are requested to the machine learning model to generate the scenic metric for the road segment.

12. The computing device of claim 10, wherein the instructions further cause the computing device to:
train the machine learning model further based on one or more terms associated with each road segment; and
for each road segment on each candidate route in the set of candidate routes:
obtain one or more terms associated with the road segment; and
apply the one or more terms to the machine learning model to generate the scenic metric for the road segment.

13. The computing device of claim 10, wherein the instructions further cause the computing device to:
obtain for at least one of the road segments on at least one candidate route in the set of candidate routes, a visibility metric indicative of visibility of a landmark from the road segment; and
adjust the scenic metric based on the obtained indication.

14. The computing device of claim 10, wherein to select a route from the set of candidate routes based at least in part on the scenic metrics for each candidate route, the instructions cause the computing device to:
for each candidate route:
assign a score to each road segment within the candidate route based at least in part on the scenic metric of the road segment;
combine the scores for each road segment within the candidate route to generate an overall score; and
select the route from the set of candidate routes according to the overall score for each respective candidate route.

15. The computing device of claim 14, wherein to assign a score to each road segment within the candidate route based at least in part on the scenic metric of the road segment, the instructions cause the computing device to:
assign a score to each road segment within the candidate route based on an estimated amount of time for traversing the road segment; and
adjust the score for each road segment based on the scenic metric for the road segment.

16. The computing device of claim 10, wherein the map feature data for each of the plurality of road segments includes at least one of: a location of the road segment, a distance from the road segment to a nearest landmark, a size of the nearest landmark, a visibility metric indicative of visibility of the nearest landmark from the road segment, or a popularity metric indicative of popularity of the landmark.

17. The computing device of claim 10, wherein the request for navigation directions from a starting location to a destination location is a request for a tour around a geographic area beginning and ending at the starting location, and wherein the instructions further cause the computing device to:
for each road segment in the geographic area:
obtain map feature data for the road segment; and
apply the machine learning model to the map feature data for the road segment to generate a scenic metric for the road segment; and
select a route based at least in part on the scenic metrics for each road segment in the geographic area.

18. A method for providing navigation directions in response to a request for a tour of a geographic area, the method comprising:
receiving, by the one or more processors, a request for a tour of a geographic area beginning and ending at a starting location;
for each road segment in the geographic area, assigning, by the one or more processors, a scenic metric to the road segment indicative of a quality of a view from the road segment by applying characteristics of the road segment to a machine learning model trained to generate scenic metrics for road segments;
selecting, by the one or more processors, a subset of the road segments in the geographic area based on the scenic metrics of the road segments;
generating, by the one or more processors, a route beginning and ending at the starting location, the route including each of the selected subset of road segments; and
providing, by the one or more processors, a set of navigation directions for presentation on a client device for navigating on the tour around the geographic area via the generated route.

19. The method of claim 18, wherein selecting the subset of the road segments includes selecting, by the one or more processors, the subset of road segments in the geographic area each having a scenic metric above a threshold metric.

20. The method of claim 18, wherein selecting the route includes selecting, by the one or more processors, the route including each of the selected subset of road segments and one or more additional road segments for traversing the set of road segments beginning and ending at the starting location.

* * * * *